Jan. 20, 1942.  W. G. WILSON  2,270,365
VALVE
Filed Oct. 31, 1939  3 Sheets-Sheet 1

INVENTOR
Wylie G. Wilson
BY Ramsey, Kent, Chisholm and Lutz
his ATTORNEYS

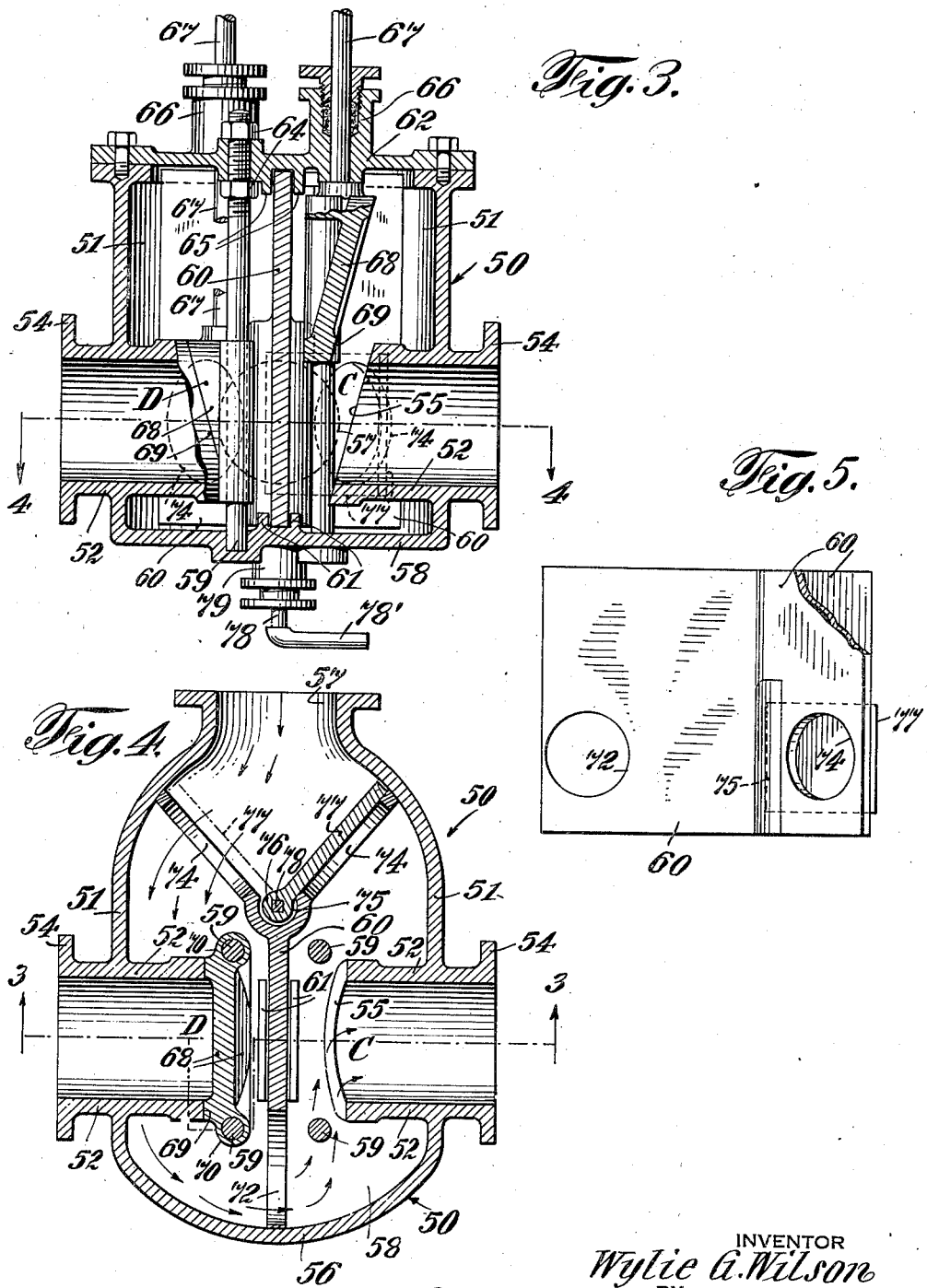

Jan. 20, 1942.  W. G. WILSON  2,270,365
VALVE
Filed Oct. 31, 1939  3 Sheets—Sheet 3
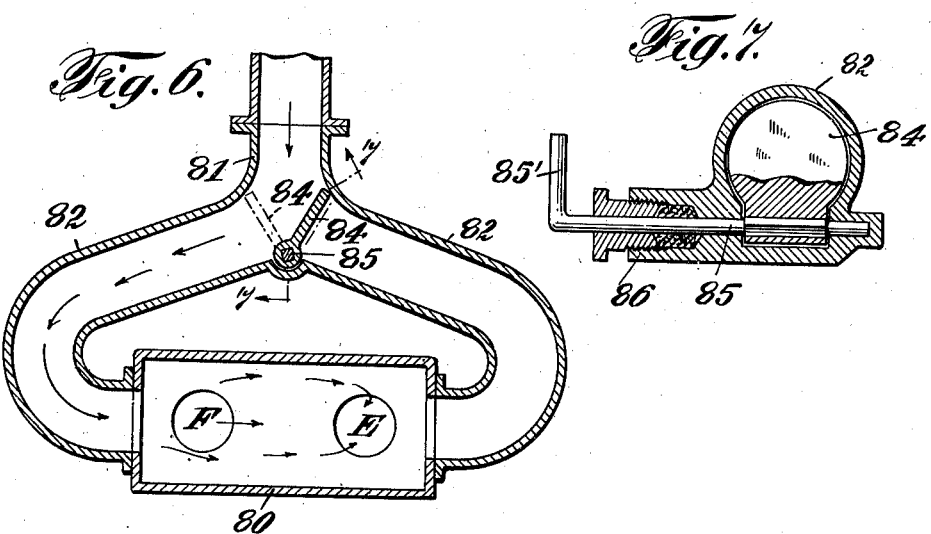
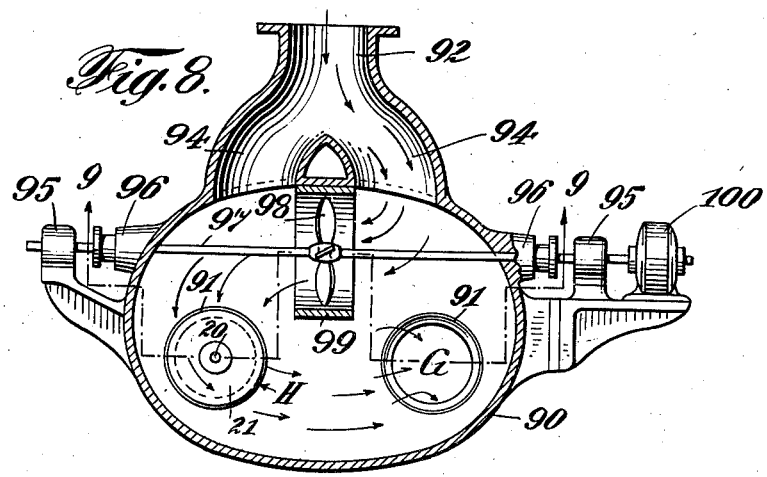
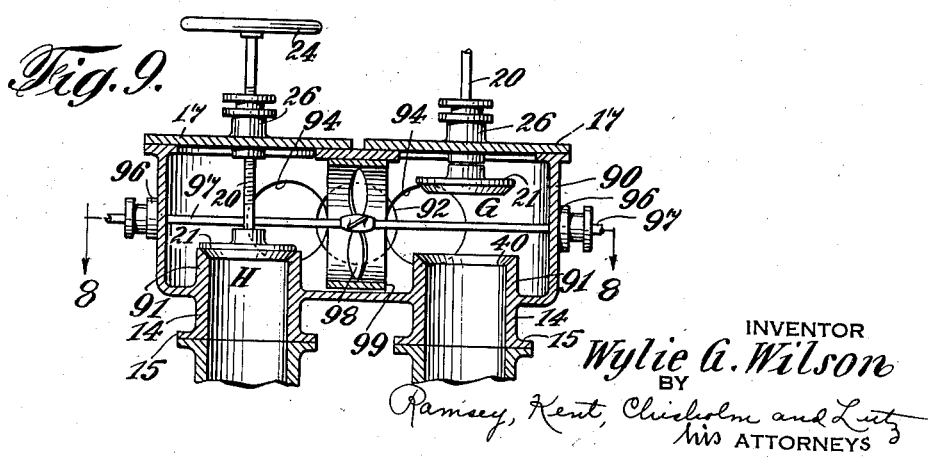
INVENTOR
Wylie G. Wilson
BY
Ramsey, Kent, Chisholm and Lutz
his ATTORNEYS Patented Jan. 20, 1942

2,270,365

UNITED STATES PATENT OFFICE 2,270,365

VALVE

Wylie G. Wilson, Elizabeth, N. J.

Application October 31, 1939, Serial No. 302,079

12 Claims. (Cl. 277—57)

This invention relates to improvements in valves and more particularly to improvements in valves especially adapted for high temperature work.

In certain industries and particularly in the oil industry, pipe lines, and consequently valves, handling material and more particularly gases, are required to operate at relatively high temperatures, in the order of 1100° F. Heretofore, use has been made of comparatively small valves in such pipe lines, i. e., valves of the order of 4 to 6 inches in diameter. Some difficulty has been experienced with these valves but the difficulties are not unsurmountable. Moreover, in certain branches of the oil industry it is desirable that valve means be provided whereby the material passing through a pipe line from a source of supply can be diverted to either one of two or more supply lines for further processing as desired. In practice, one line is opened to permit the passage of the material from the source while the other line or lines remain closed and such conditions exist for a predetermined period after which a formerly closed line is opened and the formerly opened line is closed.

As a result of this change of conditions wherein the passage of the material through the branch lines is controlled by valves, a valve which was once open and then closed sustains a decided drop in temperature immediately after the closing thereof. For example, a valve operating at a temperature of 1100° will, when closed, drop in temperature to approximately 500° or 600° F. Valves of the ordinary wedge-gate type have been used in this type of apparatus. When a valve is closed and the temperature drops as before stated, the body of the valve contracts more than the wedge-gate does and since the wedge-gate has already been pushed home between its inclining sealing faces to form a seal, the result of this differential contraction of the body and the wedge-gate is that the wedge-gate becomes gripped vise-like between the sealing faces. This gripping is objectionable but in relatively small valves, i. e., valves not greater than 6 inches in diameter, the problem can be overcome by the application of sufficient force to extricate the wedge-gate from between the sealing faces.

However, when it becomes desirable to make use of larger pipe lines and consequently larger valves, of the order of say 20 inches or 24 inches, then the problem of unseating a gripped valve member becomes more acute. In the event force alone is relied upon to unseat the valve, it is evident that the provision of a sufficiently large valve stem and sufficiently powerful operating means would require equipment far in excess of that normally required for such operation. Furthermore, this differential temperature change presents another problem in the case of large valves in that the sealing member, whether it be of a disc type, a wedge-gate or any other shape, is apt to become distorted following wide changes in temperature. For example, a sealing member which has regular sealing surfaces at a temperature of the order of 1100° F., would, in all probabilities, become so warped following a drop in temperature to 500° F., that the sealing surfaces would no longer be regular and consequently the seal once formed would become considerably impaired.

Furthermore, modern practice requires that such valve arrangements not only be power operated but also that the power mechanism be governed by some master control so that remote control of the operation can be accomplished. Under these conditions it is necessary that any chance of the valve refusing to open be completely eliminated and consequently certainty of operation is an essential.

An object of the present invention is to provide a valve arrangement in which a plurality of valves controlling outlet sources are maintained at substantially the same operating temperature whether the valves be opened or closed.

Another object of the invention is to provide an arrangement whereby a plurality of outlet valves can be open in sequence and can be maintained at substantially the same temperature whether opened or closed.

Another object of the invention is to provide an arrangement wherein two or more outlet valves are combined in a chamber having a single inlet, such outlet valves having their seats spaced from the casing so that the same may be maintained at a high operating temperature with great efficiency.

A further object of the invention is to provide an arrangement in accordance with the foregoing wherein means are supplied for directing incoming hot fluid around a closed valve before the fluid pases out of the chamber through the open valve.

In carrying out the foregoing and other objects of the invention, a device made in accordance therewith comprises a casing having an inlet conduit communicating therewith and having at least two outlet conduits also communicating therewith. The outlet conduits are in effect extended into the casing so that the inner ends thereof form valve seats spaced from the walls of the casing. In conjunction with the valve seats use is made of valve members positioned in the casing and operable from without the casing. These valve members may be of any desired type to cooperate with the seats and may be of disc type, wedge-gate type or any other suitable type. Since the seats are located interiorly of the casing and spaced from the walls thereof, it follows that these seats are insulated to some degree from drop in temperature caused by conduction from without the casing. In addition, hot fluid can circulate around the seat regardless of whether the associated valve member is opened or closed so that the seat and associated valve member can be maintained at approximately the temperature of hot fluid passing through the casing. Since it is customary to operate the outlet valves of the device alternately, or if the valves be more than two in number, in predetermined sequence, means are provided for assuring the maintenance of high temperature both of the valve seats and valve elements regardless of whether a particular valve be opened or closed. To this end diverter mechanism can be employed in conjunction with the casing to assure passage of hot fluid around a closed valve before such fluid leaves the casing through an open valve. Such diverter mechanism may be of any of several types such as an elbow member movable to direct incoming hot fluid to a desired closed valve; a flap member for the same purpose; or a fan which can be of reversible type for the same purpose.

Other features, objects and advantages of the invention will become apparent by reference to the following detailed description of the accompanying drawings wherein:

Fig. 3 is a vertical section of a modification of the invention and taken substantially on the line 3—3 of Fig. 4;

Fig. 4 is a section taken substantially on the line 4—4 of Fig. 3;

Fig. 5 is a side view of the central partition incorporated in the structure of Figs. 3 and 4;

Fig. 6 is a horizontal section illustrating a further modification of the invention;

Fig. 7 is an enlarged section taken substantially on the line 7—7 of Fig. 6;

Fig. 8 is a vertical section through a still further modification of the invention, such section being taken substantially on the line 8—8 of Fig. 9, and Fig. 9 is a section taken substantially on the line 9—9 of Fig. 8.

Figure 1:
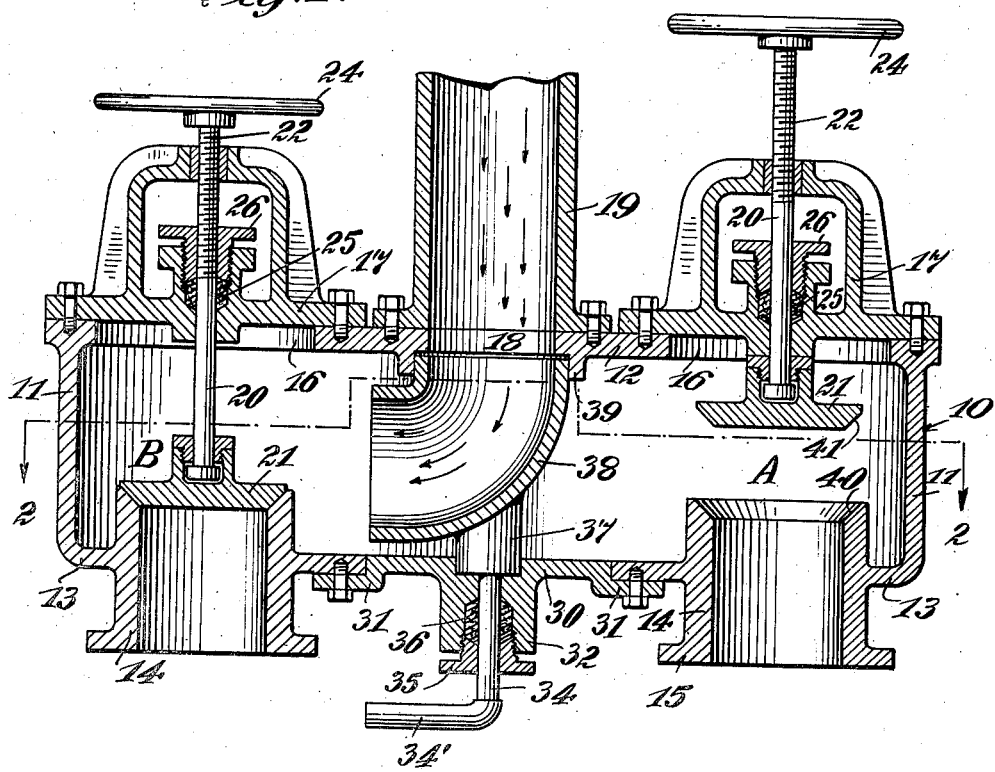
Fig. 1 is a vertical section through a device incorporating the invention.
Figure 2:
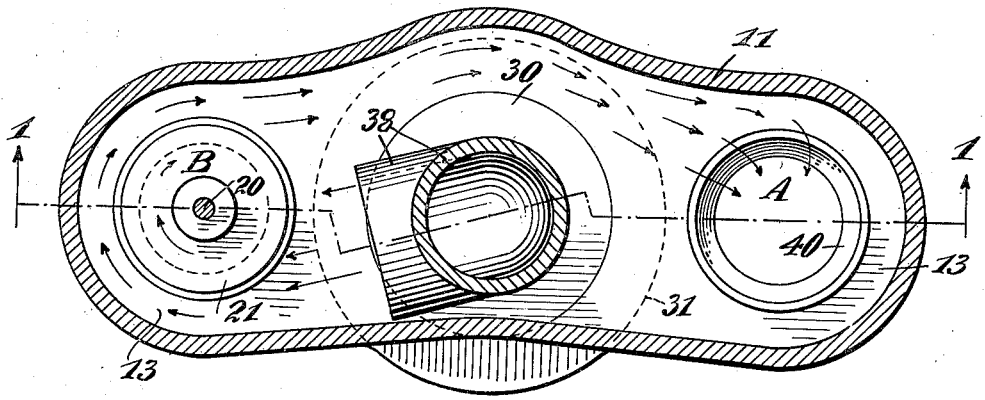
Fig. 2 is a section taken substantially on the line 2—2 of Fig. 1.

Referring now to the drawings and particularly to Figs. 1 and 2, 10 indicates generally a casing in which mechanism incorporating the invention is installed. The casing is shaped in cross-section substantially as shown in Fig. 2 and has side walls 11, a top 12 and a bottom 13. The bottom 13 in the form shown has made integrally therewith a pair of tubular parts 14 the top ends of which extend upwardly into the chamber afforded by the casing 10. The lower end of each tubular part 14 extends downwardly beyond the bottom 13 and has a flange 15 for the attachment of a suitable pipe. The top 12 is provided near each end with openings 16 adapted to be covered by valve stem supporting mechanisms 17 bolted or otherwise secured to the top. Also the top 12 has an opening 18 formed intermediate the ends thereof with which opening a pipe 19 can be aligned and the pipe can also be bolted or otherwise secured to the top 12.

Each valve stem supporting mechanism 17 is apertured for the passage of a valve stem 20 to the lower end of which is secured in a conventional fashion, a disc valve member 21. The upper part of the stem 20 is threaded as at 22 to engage threads in the top of the support 17 so that the stem can be rotated by a handle 24 or by other suitable means to cause vertical movement of the valve member 21. A stuffing box has packing material 25 therein and a packing compressor 26 is threaded into part of the support 17 to apply the required compression to packing material 25.

An opening is provided in the bottom 13, which opening is adapted to be closed by a plate member 30 flanged as at 31 to permit securing of the plate to the bottom member by bolts or other suitable means. The plate 30 has a depending part 32 apertured for the passage of a stem 34 and counterbored and internally threaded to receive a packing compressor 35 acting on packing material 36. To the upper end of stem 34 is secured a cylindrical member 37 seated in a suitable recess in the plate 30 and having secured to the top thereof an elbow member 38 of tubular form in cross-section. The upper end of this elbow 38 is received in a suitable annular depending member 39 formed integrally with the top 12. The lower end of the stem 34 as shown is bent at right angles to form a part 34' which extends in the same direction as the direction of passage of material through the elbow 38.

The tops of the tubular portions 14 are shown bevelled as at 40 while the lower edges of the valve members 21 are also bevelled as at 41 and on substantially the same angle as that of the parts 40. These cooperating bevelled surfaces provide a valve seat and valve construction for effecting a good fluid seal.

The operation and use of this arrangement is substantially as follows. The pipe 19 serves as an inlet for hot fluid which may be at a temperature in the order of 1100° F. In some commercial processes, it is desirable that hot fluid from a source be directed to one part of the processing equipment for a predetermined period, after which it is desirable for the fluid to be directed to another part of the processing equipment and at the same time flow be stopped to the first part of the equipment. Accordingly, the mechanism just described can be used for this purpose by having one of the outlet valves controlled by the valve members 21 closed while the other valve is open. As shown in Fig. 1, the left hand outlet valve, or valve B, is closed while the right hand outlet valve, or valve A, is opened. At the same time, the elbow 38 is turned to direct fluid from the inlet 19 through the elbow and toward the closed valve, it being understood that the elbow is aligned with the inlet so that the incoming fluid must pass therethrough. Thus it follows that substantially all incoming fluid sweeps around the closed valve bathing the same and maintaining the operating parts of the valve, including the seat, at substantially the temperature of the incoming fluid. After passing around and over the closed valve, the fluid travels to the open valve from which it is discharged into a suitable outlet pipe secured to the tubular member 14 and leading to other apparatus.

When during the operation of the equipment it is desirable to divert the incoming fluid from the apparatus associated with valve A and direct it to the apparatus associated with valve B, the formerly opened valve can be closed and the formerly closed valve can be opened. At the same time, the elbow 38 is rotated about its axis from the position shown in Figs. 1 and 2 to a similar position relative to valve A so that the fluid introduced into the valve chamber must now sweep around the closed valve A before passing out of the chamber through the now open valve B. Thus, the formerly opened valve which was at substantially the temperature of the fluid passing through the chamber is maintained at this same temperature while closed so that when the valve is again opened, any material change in temperature has not occurred.

This arrangement wherein both valves in the casing are maintained at substantially the temperature of the fluid passing through the chamber has the advantage that the valve parts do not suffer a marked drop in temperature with the result that a seal formed by the valve element and the valve seat when these parts are heated to high temperature, is maintained and consequently there is no differential change in temperature between the valve seat and the valve element. Thus, warping or other distortion of a valve member which might be occasioned by an appreciable drop in temperature is completely overcome. Differential change in temperature between the valve seat and valve element is further prevented by the arrangement wherein the valve seat is located in the valve chamber at some distance from any wall of the chamber so that the hot fluid can pass around the valve seat and thereby overcome conduction from without the valve chamber which might tend to reduce the temperature of the valve seat relative to the valve member.

The extension 34' on the stem 34 operating elbow 38 indicates at all times the direction of flow of incoming liquid so that it may be noted at any time whether the incoming liquid is directed toward a closed valve or not. It is to be understood of course that while the valves and the elbow have been illustrated as being adapted for manual operation, at the same time, automatic operating mechanism may be associated with the valves and the elbow so that these parts can be operated under some remote control mechanism. Inasmuch as such operating equipment forms no part of the invention, no illustration has been made thereof.

Referring now to the embodiment of the invention shown in Figs. 3 to 5 inclusive, 50 indicates generally a casing for the valve construction, such casing having a cross-section of the shape shown in Fig. 4. This casing 50 has side walls 51 which are provided with integral tubular formations 52, one end of each of which extends into the casing and the other end of which extends beyond the casing with a flange 54 thereon for the attachment of discharge pipe. The inner ends of the formations 52 are sloped downwardly as at 55 to form valve seats against which wedge-gate valve members can be forced. One end of casing 50 is rounded as at 56 while the opposite end thereof is shaped in tubular form as at 57 and flanged to receive an inlet supply pipe.

The bottom 58 of the casing has recesses therein to receive pairs of guide rods 59 located on each side of a Y-shaped partition member positioned in the casing between upstanding ears 61 formed in the upper surface of the bottom 58. The top of the casing 50 is shown at 62 being separable from the casing and secured thereon by bolts or any other suitable fashion. The top also has formations to receive the upper ends of the pairs of guide rods 59, such rods having their upper ends extending through openings in the top 62 and being threaded whereby they may be secured to the top 62 by nuts 64 so that the guide rods can be removed from the casing along with the top. Ears 65, similar to ears 62, serve to locate the partition 60 relative to the top. The top 62 is also provided with stuffing boxes 66 through which pass valve stems 67.

Each valve stem 67 has secured to the lower end thereof a wedge-gate 68 having one surface thereof inclined at the same angle as the inclination of the sealing surface 55 of a member 52 and provided with a sealing face 69 to engage the surface 55. Each wedge-gate 68 has lateral extensions or enlargements 70 provided with through apertures to receive the guide rods 59. Thus it is apparent that the gates slide on these rods 59 which serve to position the gates accurately so that when either valve is closed, the surface 69 contacts the surface 55 to form a good fluid seal. The valves are operated by vertical movement of the respective stems 67 which movement can be accomplished in any customary manner.

The partition 60, as before stated, is substantially Y-shaped and is positioned in the casing with a fit which need not be fluid tight. The leg part of the partition 60 is provided with an opening 72 positioned adjacent the curved end 56 of the valve casing and near the bottom thereof. Each arm of the partition is provided with an opening 74 located near the bottom edge of the partition and substantially in line with the opening 72. The crotch formed by the arms of the partition has a part thereof rounded as at 75 to receive a rounded end part 76 of a flap member 77. Flap member 77 is fixedly secured to a stem 78 which extends through the bottom 58 of the casing and through a stuffing box 79 also secured to the bottom of the casing. The stem 78 has a right angularly extending arm 78'. Due to this arrangement, it is possible by manipulation of the extension 78' to swing the flap 77 from the full line position of Fig. 4 to the dotted line position thereon and the extension 78' indicates the position of the flap. In either position, one of the holes 74 is covered by a flap.

The use and operation of this embodiment of the invention is substantially the same as that described in connection with the preceding embodiment, in that when the valve designated C is opened, the valve designated D is closed, or, in other words, the right hand valve is opened and the left hand valve is closed. Under these conditions the flap 77 is positioned in the full line showing of Fig. 4 so that the right hand opening 74 is closed by this flap. Fluid entering through the inlet 57 therefore passes through the left hand opening 74 in the partition, sweeps around or bathes the closed valve D, then passes through opening 72 in the partition and out of the casing through the open valve C. When it is desired to alternate the flow of fluid from the casing, the formerly open valve C is closed and the formerly closed valve D is opened. At the same time the flap 77 is moved to the dotted line position of Fig. 4 so that fluid then passes through the right hand opening 74, bathes the closed valve C, passes through opening 72 and out of casing through the now open valve D. The same advantages are obtained in this construction as are obtained in the previously described embodiment of the invention.

In Figs. 6 and 7, a somewhat diagrammatic form of modification of the invention has been shown. Referring to Fig. 7, 80 indicates generally a valve casing having associated therewith a forked inlet made up of a main portion 81 and two branch portions 82. The branch portions 82 enter the respective ends of the casing 80. Mounted in the casing 80 in the manner shown in Fig. 1 are two valves indicated generally at E and F. A flap member 84 formed in the same fashion as the flap member 77 of Fig. 4 is positioned at the junction of the two branches 82 and is mounted for rotation from the full line position of Fig. 6 to the dotted line position of the same figure. This flap 84 is fastened to a stem 85 which passes through an enlargement of the branch junction and through a stuffing box 86. The upper end of the stem 85 fits in a recess in the enlargement. The end of the stem 85 is bent at right angles as at 85' to indicate positioning of the flap.

In this modified form of the invention, the operation is the same as that previously described, namely, when the valve E is opened, the flap 84 is moved to the full line position (Fig. 6). Under these conditions, the incoming fluid passes through the left hand branch 82 into the left hand end of the valve casing, bathing the closed valve F, and passing from the casing through the open valve E. When the conditions of these valves are reversed, the flap is moved to the dotted line position, causing fluid to enter the casing through the right hand branch 82, bathe the closed valve E and pass out of the casing through the open valve F.

In Figs. 8 and 9 a still further embodiment of the invention is shown. In this embodiment, a casing 90 has two valves G and H mounted therein in the same manner as the valves A and B of Fig. 1. Provision is made for these valves by having the casing formed with integral tubular formations 91, the upper ends of which are bevelled to provide valve seats. A single inlet 92 communicates with the casing by means of two branch passages 94.

Mounted in suitable bearings 95 secured exteriorly of the casing and passing through stuffing boxes 96 is shaft 97 having a fan 98 mounted thereon in a circular cage 99. A motor 100 also secured to a suitable support, such as the casing, has its shaft coupled in some fashion to the shaft 97. This motor is preferably of reversible type so that the fan can be rotated in either direction.

The operation of this device follows the same pattern as that previously described. For example, if the valve G is open and the valve H closed, then the fan is rotated in such direction as to draw incoming liquid through the right hand passage 94 and direct it toward the closed valve H to bathe the same before the fluid can pass from the casing through the open valve G. This line of flow is indicated by arrows in Fig. 8. When the condition of the valves is reversed, i. e., valve G closed and valve H open, then the direction of rotation of the fan is reversed so that incoming fluid is drawn through the left hand channel 94 by the fan and directed by the fan around closed valve G and thence out of the casing through open valve H.

While in some forms of the invention use has been shown of a flap diverter device for changing the direction of flow of the fluid, an elbow device has been used in any other form, and a fan in a still further form, it is to be understood that these diverter arrangements can be used selectively with any form of valve casing and valve elements. This change of parts will be so apparent to those skilled in the art as to require no illustration thereof. Also it will be apparent that the degree of diversion of fluid can be controlled by any of the diverter arrangements to direct any desired quantity of the inlet fluid toward any closed valve. It may not be necessary in all instances for the full flow of incoming fluid to be directed toward the closed valve since in some cases a percentage of the flow will be sufficient. This control of fluid flow can be accomplished by positioning of the flaps or of the elbow and by a change or control of speed of rotation of the fan.

While the various embodiments of the invention have been illustrated as making use of two outlet passages controlled by valves, it is to be understood that any number of outlet passages can be incorporated in a single valve casing structure with control of the temperature of closed valves maintained by the proper direction of incoming fluid towards such closed valves. In each form of the invention shown, it is evident that the composite valve arrangement is capable of being opened for cleaning purposes so that in the oil industry if a line should become coked to an undesirable extent, the valve can be opened and the coke readily removed therefrom and also from the communicating pipe lines.

It is to be understood that the invention can be modified beyond the illustrated embodiments; in view of which any limitations imposed thereupon are to be only those set forth in the following claims.

What is claimed is:

1. In a fluid control system having a fluid supply line and a plurality of branch lines supplied by said supply line, individual control means for controlling passage of fluid through said branch lines, said means being operable in sequence whereby one branch line is open for the passage of fluid therethrough while another branch line is closed, and means for causing fluid passing through an open branch line to bathe the control means for a closed branch line before the fluid passes through the control means of the open branch line, whereby the closed control means is maintained at substantially the temperature of the fluid passing through the open branch line.

2. In a fluid control system, a casing, a fluid supply line and a plurality of branch lines communicating with said casing, valve means in said casing for controlling passage of fluid through said branch lines, said valve means being operable in sequence whereby one branch line is open for the passage of fluid therethrough while another branch line is closed, and means for causing fluid from said supply line to bathe the valve means for a closed branch line before the fluid passes through an open branch line to maintain said control means at substantially the temperature of the fluid.

3. In a fluid control system having a fluid supply line and a plurality of branch lines supplied by said supply line, control means for controlling passage of fluid through said branch lines, said means being operable in sequence whereby one branch line is open for the passage of fluid therethrough while another branch line is closed, and means for causing fluid passing through an open branch line to bathe the control means for a closed branch line and part of the same branch line before the fluid passes into an open branch line to maintain said control means at a temperature near that of the fluid.

4. In a fluid control system, a casing having a fluid supply line and a plurality of branch lines supplied by said supply line, control means for controlling passage of fluid through said branch lines, all of said control means being simultaneously exposed to fluid in the casing at substantially the same temperature for all of said control means, said means being operable in sequence whereby one branch line is open for the passage of fluid therethrough while another branch line is closed, and adjustable means in said casing for directing fluid from said supply line toward and around the control means for a closed branch line before said fluid passes from the casing through an open branch line.

5. In a fluid control system, a casing having a fluid supply line and a plurality of branch lines supplied by said supply line, control means in said casing and spaced from the walls thereof for controlling passage of fluid through said branch lines, said control means being operable in sequence whereby one branch line has fluid passing therethrough, while another branch line is closed, and means for causing fluid from said supply line to pass around a closed control means before the fluid passes through an open control means to bathe said closed control means and to maintain said closed control means at a temperature near that of the fluid.

6. In a fluid control system, a casing, a fluid inlet communicating with said casing, a plurality of fluid outlets communicating with said casing, valve means in said casing controlling the passage of fluid through said outlets and all simultaneously exposed to the fluid introduced in the casing at substantially the same temperature for all of said valve means, and means in said casing for directing fluid toward and around a selected valve means in the casing.

7. In a fluid control system a casing member, a fluid inlet communicating with said casing, a plurality of fluid outlets communicating with said casing, valve means in said casing controlling the passage of fluid through said outlets and all simultaneously exposed to the fluid introduced in the casing at substantially the same temperature for all of said valve means, and discharge means in said casing in communication with said inlet and movable for discharging fluid toward and around a selected valve means in the casing.

8. In a fluid control system a casing member, a branched fluid inlet communicating with said casing, a plurality of fluid outlets communicating with said casing, valve means in said casing controlling the passage of fluid through said outlets and all simultaneously exposed to the fluid introduced in the casing at substantially the same temperature for all of said valve means, and means in said casing for directing fluid through a selected branch of said inlet and toward and around a selected valve means in the casing.

9. In a fluid control system a casing member, a branched fluid inlet communicating with said casing, a plurality of fluid outlets communicating with said casing, valve means in said casing controlling the passage of fluid through said outlets and all simultaneously exposed to the fluid introduced in the casing at substantially the same temperature for all of said valve means, and means in said casing for causing fluid to enter the casing through a selected branch of said inlet and for directing the fluid toward and around a selected valve means in the casing.

10. In a fluid control system a casing member, a fluid inlet communicating with said casing, a plurality of fluid outlets communicating with said casing, valve means in said casing controlling the passage of fluid through said outlets and all simultaneously exposed to the fluid introduced in the casing at substantially the same temperature for all of said valve means, and reversible rotary propulsive means in said casing for directing fluid toward and around a selected valve means in the casing.

11. In a fluid control system a casing member, a fluid inlet communicating with said casing, a plurality of fluid outlet conduits communicating with said casing, the said outlet conduits having portions thereof extending into said casing and having valve seats on the ends thereof spaced from the walls of the casing, valve means cooperating with said valve seats to control the passage of fluid through said casing and means in said casing for directing incoming fluid toward and around selected valve means.

12. In a fluid control system a casing member, a branched fluid inlet communicating with said casing, a plurality of fluid outlet conduits communicating with said casing, the said outlet conduits having portions thereof extending into said casing and having valve seats on the ends thereof spaced from the walls of the casing, valve means cooperating with said valve seats to control the passage of fluid through said casing and means in the casing for causing fluid to enter the casing through a selected branch of said inlet whereby the fluid bathes selected valve means.

WYLIE G. WILSON.